United States Patent
Lung et al.

(10) Patent No.: US 11,926,114 B2
(45) Date of Patent: Mar. 12, 2024

(54) METHOD AND APPARATUS FOR FORMING A NON-PNEUMATIC TIRE CARCASS

(71) Applicant: COMPAGNIE GENERALE DES ETABLISSMENTS MICHELIN, Clermont-Ferrand (FR)

(72) Inventors: David C. Lung, Simpsonville, SC (US); Michael Widmyer, Moore, SC (US); Eric Rivers, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 967 days.

(21) Appl. No.: 16/765,814

(22) PCT Filed: Nov. 21, 2017

(86) PCT No.: PCT/US2017/062892
§ 371 (c)(1),
(2) Date: May 20, 2020

(87) PCT Pub. No.: WO2019/103728
PCT Pub. Date: May 31, 2019

(65) Prior Publication Data
US 2020/0376789 A1    Dec. 3, 2020

(51) Int. Cl.
*B21D 53/26* (2006.01)
*B29C 43/02* (2006.01)
(Continued)

(52) U.S. Cl.
CPC ............ *B29D 30/02* (2013.01); *B29C 43/027* (2013.01); *B29C 65/4805* (2013.01);
(Continued)

(58) Field of Classification Search
CPC . B21D 53/26; B29C 43/027; B29C 2043/189; B29C 2043/3644;
(Continued)

(56) References Cited

U.S. PATENT DOCUMENTS

2019/0001744 A1\* 1/2019 Delfino ..................... B60C 7/14

FOREIGN PATENT DOCUMENTS

| WO | 2017116385 A1 | 7/2017 |
| WO | 2017116389 A1 | 7/2017 |
| WO | 2017117605 A1 | 7/2017 |

OTHER PUBLICATIONS

International Search Report and Written Opinion for PCT/2017/062892 dated Aug. 23, 2018.

\* cited by examiner

*Primary Examiner* — Leo B Tentoni
(74) *Attorney, Agent, or Firm* — Hahn Loeser & Parks, LLP; Bret A. Hrivnak

(57) ABSTRACT

This disclosure includes methods and apparatus for forming a non-pneumatic tire carcass comprising an inner hub, an outer band, and a plurality of spokes. The method includes arranging the inner hub, the plurality of spokes, and the outer band to form a curing assembly arranged in a first arrangement within a forming apparatus, where the inner hub is arranged concentrically within a radially inner annular side of the outer band and the plurality of spokes are arranged between the outer band and the inner hub. The plurality of spokes are forced in opposite radial directions from the first arrangement and to a second arrangement, where each spoke of the plurality of spokes is forced in a curing position against the inner hub and towards the outer band in a curing arrangement. The plurality of spokes are then cured to each of the inner hub and outer band.

20 Claims, 10 Drawing Sheets

(51) Int. Cl.
    *B29C 65/00* (2006.01)
    *B29C 65/48* (2006.01)
    *B29C 65/54* (2006.01)
    *B29C 70/68* (2006.01)
    *B29D 30/02* (2006.01)
    *B32B 37/10* (2006.01)
    *B32B 37/12* (2006.01)
    *B32B 38/18* (2006.01)
    *B60B 31/00* (2006.01)
    *B60C 7/18* (2006.01)
    *B60C 7/24* (2006.01)
    *B29C 43/18* (2006.01)
    *B29C 43/36* (2006.01)
    *B29C 65/02* (2006.01)
    *B29L 30/00* (2006.01)
    *B32B 38/00* (2006.01)
    *B60C 7/14* (2006.01)

(52) U.S. Cl.
    CPC ............ *B29C 66/545* (2013.01); *B29C 66/61* (2013.01); *B29C 66/74* (2013.01); *B29C 66/742* (2013.01); *B29C 70/682* (2013.01); *B32B 37/1018* (2013.01); *B32B 38/1858* (2013.01); *B60B 31/005* (2013.01); *B60C 7/18* (2013.01); *B60C 7/24* (2013.01); *B29C 2043/189* (2013.01); *B29C 2043/3644* (2013.01); *B29C 2043/3649* (2013.01); *B29C 65/02* (2013.01); *B29C 2791/006* (2013.01); *B29L 2030/004* (2013.01); *B32B 2038/0076* (2013.01); *B60C 7/146* (2021.08)

(58) Field of Classification Search
    CPC . B29C 2043/3649; B29C 65/48; B29C 65/54; B29C 66/545; B29C 66/61; B29C 66/74; B29C 66/742; B29C 70/682; B29C 2791/006; B29D 30/02; B29L 2030/004; B32B 37/1018; B32B 37/12; B32B 2038/0076; B32B 38/1858; B60B 31/00
    USPC ........ 264/263, 315, 326; 425/28.1; 156/112, 156/292, 381, 404; 29/802, 894.331
    See application file for complete search history.

METHOD AND APPARATUS FOR FORMING A NON-PNEUMATIC TIRE CARCASS

FIELD

Embodiments of this disclosure relate generally to non-pneumatic tires.

BACKGROUND

Current methods of manufacturing non-pneumatic tires including various components primarily consisting of rubber and reinforcements requires each component to be vulcanized individually and subsequently assembled together in multiple stages using adhesive or cushion gum to form each non-pneumatic tire. Additionally, current methods require the assembly to occur in two stages, whereby several rubber components, such as the tread and rubber supports/spokes are cured twice. As a result of the second curing cycle, additional thermal stresses and misalignments are introduced into the non-pneumatic tire carcass, and product deterioration and uniformity issues arise. In these methods, trapped gases can also create quality issues.

As a result, such methods are time consuming and labor intensive, and therefore are costly. Additionally, because the components are individually formed and assembled, product quality is of greater concern and requires additional effort. Accordingly, there is a need to provide a more efficient and effective method of manufacturing non-pneumatic tires.

SUMMARY

Particular embodiments of this disclosure provide a method of forming a non-pneumatic tire carcass comprising an inner hub, an outer band, and a plurality of spokes extending between the inner hub and the outer band. The inner hub and outer band each are annular, the inner hub being arranged radially inward of the outer band, each of the inner hub and the outer band having a width extending in an axial direction and defined by opposing lateral sides. The method includes arranging the inner hub, the plurality of spokes, and the outer band to form a curing assembly arranged in a first arrangement within a forming apparatus, where the inner hub is arranged concentrically within a radially inner annular side of the outer band and the plurality of spokes are arranged between the outer band and the inner hub. The method further includes forcing the plurality of spokes in opposite radial directions from the first arrangement and to a second arrangement, where each spoke of the plurality of spokes is forced in a curing position against the inner hub and towards the outer band in a curing arrangement. The method yet further includes curing the plurality of spokes to each of the inner hub and outer band.

Further embodiments of the disclosure include an apparatus for forming a non-pneumatic tire carcass comprising an inner hub, an outer band, and a plurality of spokes extending between the inner hub and the outer band. The inner hub and outer band are each annular, the inner hub being arranged radially inward of the outer band, each of the inner hub and the outer band having a width extending in an axial direction and defined by opposing lateral sides. In particular instances, the forming apparatus further includes a first support base having a first outer band abutment and a first inner hub abutment and a second support base having a second outer band abutment and a second inner hub abutment. The forming apparatus may further include a first plurality of elongate spoke supports extending axially from the first support base and to the second support base, the first plurality arranged in a first annular array, and a second plurality of elongate spoke supports extending axially from the first support base and to the second support base, the second plurality arranged in a second annular array, the first plurality being arranged concentrically within the second plurality. Each of the first and second plurality of elongate spoke supports may have a spoke-engaging portion. The forming apparatus may also include a plurality of radially-extendable members arranged between the first plurality of elongate spoke supports and the second plurality of elongate spoke supports, where one or more radially-extendable members of the plurality of radially extendable members are arranged on opposing axial sides of the spoke-engaging portions of each of the first and second plurality of elongate spoke supports.

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF THE DRAWINGS

DETAILED DESCRIPTION OF PARTICULAR EMBODIMENTS

Figure 1:
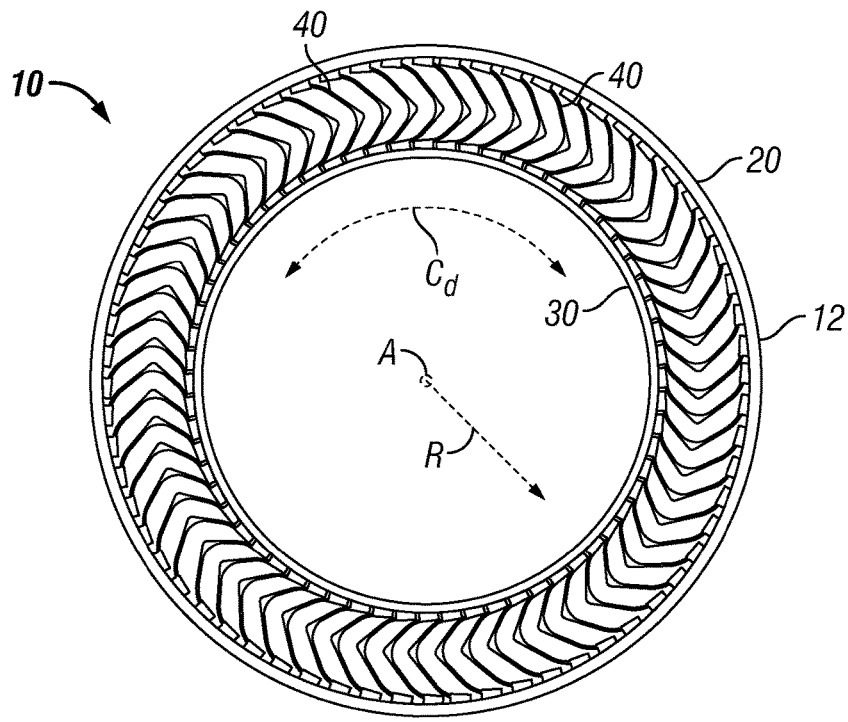
FIG. 1 is a side elevational view of a non-pneumatic tire carcass, the non-pneumatic tire carcass including a plurality of spokes affixed to an outer band and an inner hub, in accordance with an exemplary embodiment, in accordance with a particular embodiment of the disclosure.

The following terms are defined as follows for this disclosure:

"Axial direction," "axially," or the letter "$A_d$" in the figures refers to a direction extending along the axis of rotation or a direction parallel to the axis of rotation of, for example, the outer band, the inner hub, or more generally, the non-pneumatic tire carcass.

"Radial direction," "radially," or the letter "$R_d$" in the figures refers to a direction that is orthogonal to the axis of rotation and extends in the same direction as any radius extending orthogonally from the rotational axis.

"Circumferential direction" or the letter "$C_d$" in the figures refers to a direction is orthogonal to an axial direction and orthogonal to a radial direction.

"Lateral direction" or "widthwise direction" or the letter "$Lat_d$" is synonymous with axial direction.

"Elastic material" or "elastomer" as used herein refers to a polymer exhibiting rubber-like elasticity, such as a material comprising rubber, whether natural, synthetic, or a blend of both natural and synthetic rubbers.

"Elastomeric" as used herein refers to a material comprising an elastic material or elastomer, such as a material comprising rubber.

"Rigid" as used herein means unable to bend or be forced out of shape without plastic deformation under anticipated loading; not flexible.

The present disclosure provides methods and apparatuses for improved manufacture of non-pneumatic tire carcasses and more generally non-pneumatic tires. A non-pneumatic tire carcass generally comprises an inner hub, an outer band, and a plurality of spokes extending between the inner hub and the outer band, the inner hub and outer band each being annular, the inner hub being arranged radially inward of the outer band, each of the inner hub and the outer band having a width extending in an axial direction and defined by opposing lateral sides.

Outer band, which is also referred to as a shear band, comprises a reinforced polymeric ring including a plurality of reinforcement layers (not shown), each such layer formed of an elastomeric matrix including a plurality of elongate reinforcements. Therefore, outer band is characterized as being a reinforced, flexible structure. Outer band has a thickness bounded by an outer radial side and an inner radial side, the inner side being arranged radially inward of the outer side. Outer band is not configured to retain any pressurized air.

Inner hub, also referred to as a central annular portion, forms an inner annular portion that is rigid and capable of being operably attached to a vehicle directly or indirectly. By virtue of inner hub, a non-pneumatic tire may be installed on a vehicle to allow the vehicle to roll across a ground surface. It is appreciated that a non-pneumatic tire may be mounted upon any desired wheeled vehicle, such as, but not limited to: passenger vehicles, heavy duty trucks, trailers, light trucks, off-road vehicles, ATVs, buses, aircrafts, agricultural vehicles, mining vehicles, bicycles, and motorcycles. Inner hub includes an outer radial side to which the plurality of spokes are attached.

Spokes are ultimately arranged in an annular array, and attached on one end to an outer radial side of inner hub and on the other end to an inner radial side of outer band. Each spoke is formed of an elastomer or elastomeric material, which may or may not be reinforced with desired structure. Each spoke has a width extending in an axial direction of the carcass when arranged within the carcass. Each spoke also has a length configured to extend generally in a radial direction from the inner hub and to the outer band, even though the length extends along a non-linear path, one which extends both. The length of each spoke extends between inner and outer ends, the length extending along a non-linear path. It is appreciated that the plurality of spokes may comprise a first plurality and any additional one or more pluralities, where each first and additional one or more pluralities are each arranged in an annular array and positioned at different axial locations along the width of the outer band and the inner hub. In these instances, each plurality of spokes can be described as forming a layer of spokes, the layers being arranged across the width of each outer band and hub. It is appreciated that each layer of spokes may have different spokes and/or different arrangements of spokes relative any other layer.

In each instance, spokes are attached using any adhesives, such as, for example and without limitation, cyanoacrylates, polyurethane adhesives, thermoplastic polyurethanes, or any other heat curable bonding material, such as natural rubber, synthetic rubber, or any blend thereof.

The improved methods and apparatuses disclosed and described herein permit: (A) the contemporaneous assembly of all three (3) main components of a non-pneumatic tire carcass with an adhesive/curing gum; (B) the contemporaneous application of sufficient pressure to a plurality of surfaces; (C) the evacuation of trapped air during the curing of the assembled non-pneumatic tire carcass; and (D) the reduction of thermodynamic stresses on each component. These methods and apparatuses also resolve geometric interference and alignment issues that can arise in the prior methods. This is at least partially achieved by applying pressure along the spokes radially outward and inward in a single step, and the floating nature of the pressure components ensuring concentricity of the assembled tire.

Particular embodiments of such methods include arranging the inner hub, the plurality of spokes, and the outer band to form a curing assembly arranged in a first arrangement within a forming apparatus, where the inner hub is arranged concentrically within a radially inner annular side of the outer band and the plurality of spokes are arranged between the outer band and the inner hub. In the first arrangement, the inner hub, the plurality of spokes, and the outer band are aligned laterally, that is, in an axial direction, in any desired arrangement. It is appreciated, in the first arrangement any of the plurality of spokes may or may not be in contact with each of the inner hub and the outer band. When arranged in the first arrangement, the plurality of spokes may be arranged in a resting state, or in a state of tension or compression. For example, any spoke may be longer in its resting state than a radial distance between the outer band and the inner hub, such that, when arranging the spokes within the forming apparatus, which comprises a fixture, each of the spokes must be compressed (in height) to properly arrange the spokes properly relative the outer band and the inner hub.

Before or while assembling the inner hub, the outer band, and the plurality of spokes in a curing arrangement within the forming apparatus, the methods may include arranging an adhesive between the each spoke of the plurality of spokes and the inner hub and between each spoke of the plurality of spokes and the outer band. In more specific instances, where in arranging the adhesive between the each spoke and the inner hub, adhesive is applied to an outer annular side of the inner hub and/or to an inner end of each spoke of the plurality of spokes, and where in arranging the adhesive between each spoke and the outer band, adhesive is applied to an inner annular side of the outer band and/or to an outer end of each spoke of the plurality of spokes. It is appreciated that the adhesive may form any adhesive suitable for the intended purpose of permanently attaching each spoke to each of the inner hub and the outer band, the adhesive being curable using a heated curing operation. For example, and without limitation, in certain instances the adhesive is uncured rubber, such as cushion gum or any other natural or synthetic rubber.

Thereafter, the method includes forcing the plurality of spokes in opposite radial directions from the first arrangement and to a second arrangement, where each spoke of the plurality of spokes is forced in a curing position against the inner hub and towards the outer band in a curing arrangement. This is performed such that all spokes are simultaneously forced in opposite radial directions and against each of the inner hub and the outer band. In an alternative variation, opposing sides of all spokes may be first forced in one radial direction against one of the inner hub and the outer band, and then in the other radial direction against the other of the inner hub and the outer band. In any case, in forcing each spoke in opposite radial directions, whether simultaneously or separately, each such spoke deforms or stretches to elongate. In doing so, each spoke is in a state of tension, and upon affixation to each of the inner hub and the outer band, each spoke in the non-pneumatic tire carcass is pre-tensioned. This forcing may be accomplished, for example, using a plurality of extendable members, such as radially-extendable members. In certain instances, such as is shown in the embodiment described in the figures below, the plurality of radially-extendable members are arranged between a first plurality of elongate spoke supports and a second plurality of elongate spoke supports, where one or more radially-extendable members of the plurality of radially-extendable members are arranged on opposing axial sides of the spoke-engaging portions of each of the first and second pluralities of elongate spoke supports. In certain variations, each of first and second radially-extendable members comprise a radially outward extendable member and a radially inward extendable member, the radially outward extendable member configured to force the outer end of each corresponding spoke toward the outer band, the radially inward extendable member configured to force the inner end of each corresponding spoke toward the inner hub. It is appreciated that in certain instances, for example, these extendable members are annular membranes (flexible bladders) configured to expand, such as when inflated with pressurized gas(es) or due to the intake of other fluids.

The methods optionally include arranging a curing bladder around the curing assembly and the forming apparatus, where in the curing assembly the non-pneumatic tire carcass is assembled in the forming apparatus but which is not yet permanently fixed to form a final non-pneumatic tire. The curing bladder, which is also referred to as a curing membrane or curing envelop, may form any desired curing bladder. The curing bladder may form a single unitary encapsulating membrane or a 2-piece bladder including a 2-piece encapsulating membrane. It is appreciated that when arranging the curing bladder around the curing assembly and forming apparatus, the radially inner and outer spoke supports may or may not be in the second arrangement, that is, extended, whereby the spokes are all extended and forced against each of the inner hub and outer band, as this may be performed before or after arranging the curing bladder around the curing assembly. Thereafter, the method further includes creating a vacuum within the curing bladder, which may be performed in any desired manner, including any conventional manner employed for forming retreaded tires. In creating a vacuum, the curing bladder is operably connected to a vacuum source, such as a pump or the like, where the vacuum source provides vacuum pressure (negative pressure) sufficient to substantially remove all gas from within the curing bladder and the curing assembly arranged within the curing bladder. If a seal was not formed when arranging the curing bladder around the curing assembly, a seal may be formed with application of the vacuum pressure.

The methods further include curing the plurality of spokes to each of the inner hub and outer band. This may be achieved by curing any adhesive. Curing of the adhesive may occur with or without the addition of heat, meaning, the adhesive may cure sufficiently at room temperature or with the addition of heat. In particular instances, in curing the plurality of spokes to each of the inner hub and outer band, heat is applied to the curing assembly, whether or not while under vacuum in a curing bladder, until vulcanization is complete. Heat may be applied in any desired manner, such as by employing any manner employed to cure retread tires. For example, the curing assembly, whether or not encapsulated within the curing bladder, may be arranged within a curing chamber, where the chamber is a compartment that is heated to a desired temperature. If encapsulated within a curing bladder, heat is transferred through the membrane to heat the curing assembly to a desired curing temperature. The chamber may also be pressurized. The curing assembly remains in the curing chamber until vulcanization is complete.

While the forming apparatus may comprise any desired forming apparatus configured to assemble the inner hub, the outer band, and the plurality of spokes in a curing assembly with each of the spokes extended and forced against each of the inner hub and the outer band, in particular instances, the forming apparatus comprises a fixture. An exemplary forming apparatus (fixture) is described further below with reference to the figures, where additional forming apparatus comprising any other described variation or any obvious variation thereof.

The methods described above will now be described in association with an exemplary forming apparatus together with the figures filed with, and forming a part of, this application.

With reference to an exemplary embodiment shown in FIG. 1, a non-pneumatic tire carcass 10 is shown to include an outer band 20, an inner hub 30, and a plurality of spokes 40 arranged between outer band 20 and inner hub 30, and to which each of the spokes 40 are operably affixed. The rotational axis A represents the rotational axis of carcass 10, as well as the rotational axis of inner hub 20 and outer band 30, and defines any radial or axial direction referred to herein unless otherwise noted. Carcass 10 forms the portion of a non-pneumatic tire to which an annular tread (not shown) is operably attached. The tread defines an outer, ground-engaging side of a non-pneumatic tire, which extends annularly around the non-pneumatic tire.

Figure 2A:
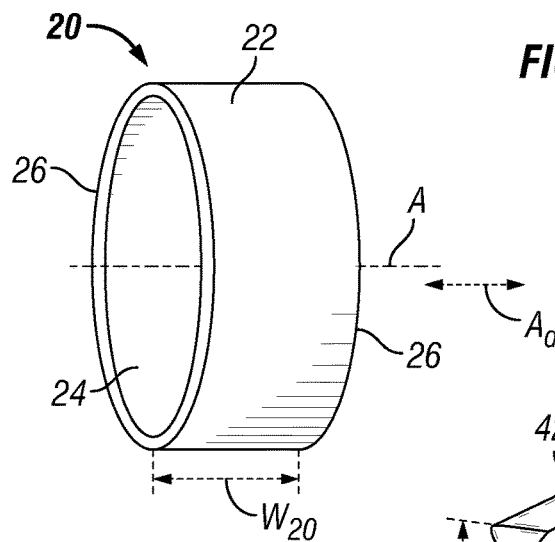
FIG. 2A is a front perspective view of the outer band of the non-pneumatic tire carcass shown in FIG. 1.

In the embodiment shown in FIG. 1, the outer radial side 12 of carcass 10 is also an outer radial side of outer band 20, as described above. As noted previously, with additional reference to FIG. 2A, outer band 20 comprises a reinforced polymeric ring including a plurality of reinforcement layers (not shown). Outer band 20 has a thickness bounded by an outer radial side 22 and an inner radial side 24, the inner side 24 being arranged radially inward of the outer side 22. Outer band 20 also has a width $W_{20}$ extending laterally between opposing lateral sides 26, and a length extending circumferentially (that is, in circumferential direction $C_d$) around rotational axis A.

Figure 2B:
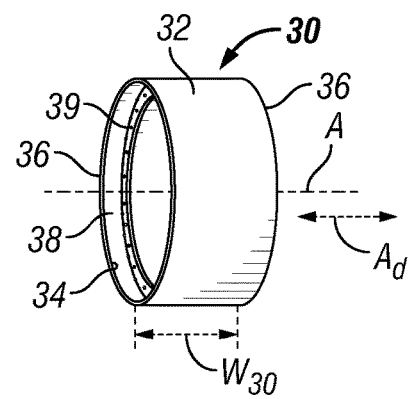
FIG. 2B is a front perspective view of the inner hub of the non-pneumatic tire carcass shown in FIG. 1.

With continued reference to FIG. 1, as well as FIG. 2B, inner hub 30 forms an inner annular portion that is rigid and capable of being operably attached to a vehicle as noted previously. Inner hub 30 has a thickness bounded by an outer radial side 32 and an inner radial side 34, the inner side 34 being arranged radially inward of the outer side 32. Inner hub 30 also has a width $W_{30}$ extending laterally between opposing lateral sides 36, and a length extending circumferentially (that is, in circumferential direction $C_d$) around rotational axis A. Inner hub 30 also includes along the inner radial side 34 at least one inner ring 38 having a plurality of spaced-apart apertures 39. Each ring 38 may be permanent or removable, such that it may be used for assembling the non-pneumatic tire carcass and subsequent thereto be removed. As a substitute, a plurality of tabs, each forming a separate structure, could be spaced apart around the inner radial side and connected thereto.

Figure 2C:
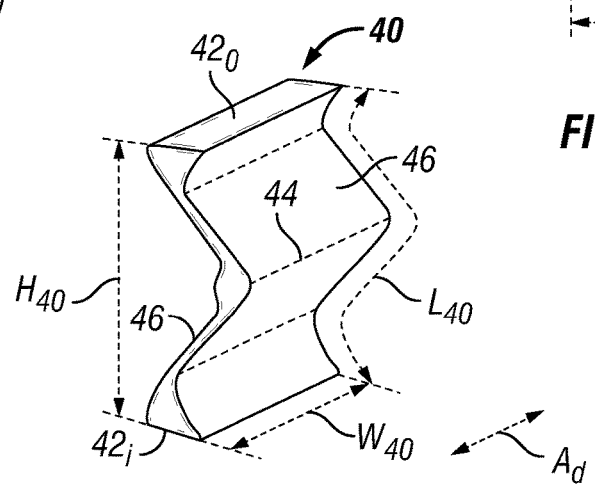
FIG. 2C is a side perspective view of one of a plurality of spokes of the non-pneumatic tire carcass shown in FIG. 1.

With continued reference to FIG. 1, as well as FIG. 2C, non-pneumatic tire carcass 10 includes a plurality of spokes 40 arranged between outer band 20 and inner hub 30, to which inner and outer terminal ends $42_i$, $42_o$ of each spoke 40 are attached in any manner contemplated herein. Spokes 40 are spaced apart and arranged in an array around inner hub 30 and rotational axis A. Each spoke 40 has a length $L_{40}$ extending from outer band 20 and to inner hub 30 to define a height $H_{40}$ of each spoke 40. In the embodiment shown, each spoke length $L_{40}$ extends along a non-linear path, which in the example shown is V-shaped and includes an apex 44 arranged between a pair of legs 46. Other non-linear paths may be employed as desired. It is noted that the straight-line distance between inner and outer terminal ends $42_i$, $42_o$ of each spoke 40 is referred to as the height $H_{40}$ of each spoke. Each spoke 40 has a width $W_{40}$ configured to extend in an axial direction $A_d$ of the non-pneumatic tire when assembled.

Figure 3:
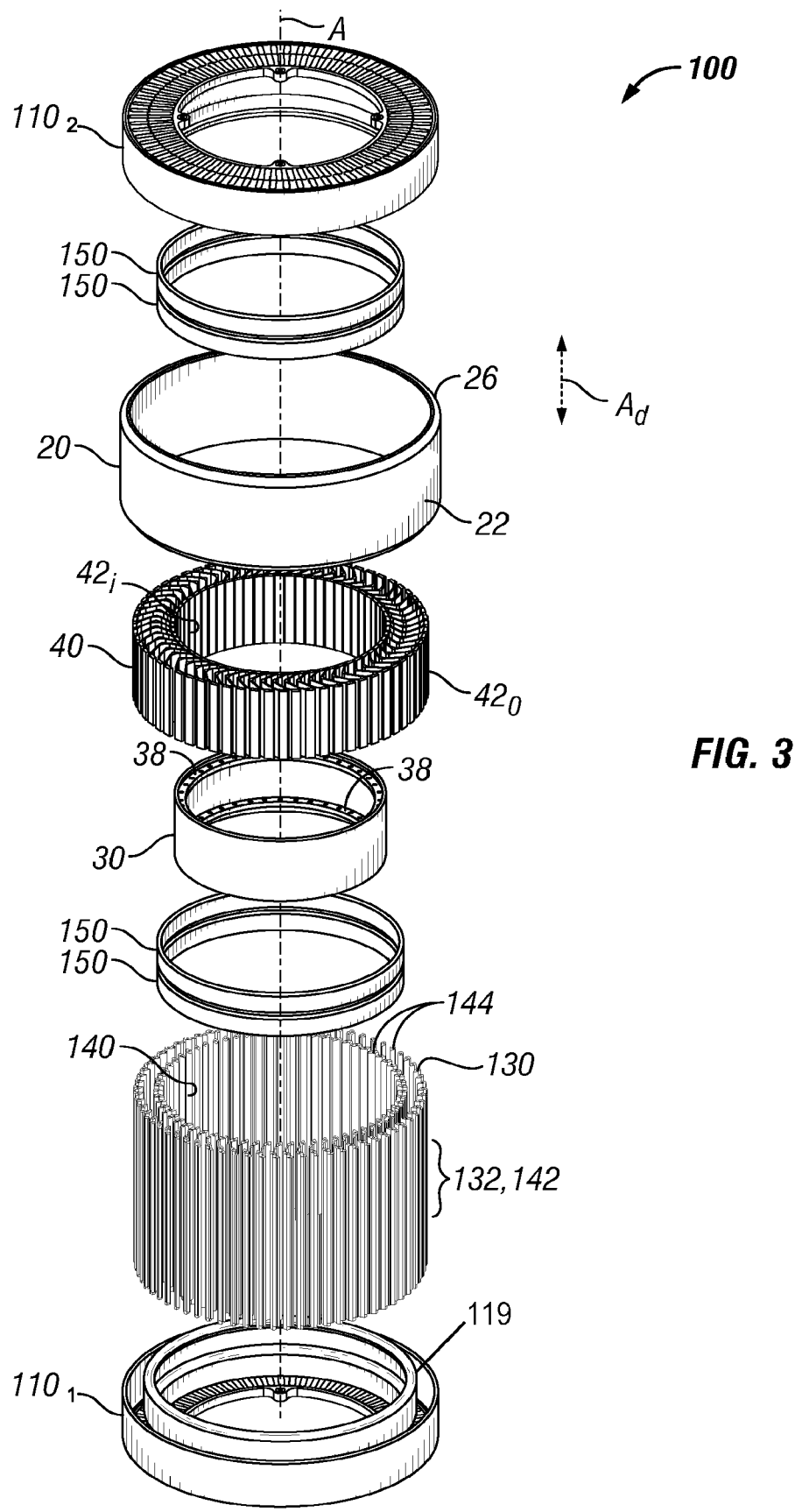
FIG. 3 is an exploded view showing an apparatus (fixture) for forming/manufacturing a non-pneumatic tire carcass, the view including an exploded assembly of the tire carcass, in accordance with a particular embodiment of the disclosure.

With reference now to FIG. 3, a forming apparatus 100 (also referred herein more simply as "fixture") for manufacturing a non-pneumatic tire carcass 10 is shown according to an exemplary embodiment, the fixture 100 being shown in an exploded view that also includes the components of the non-pneumatic tire carcass 10. Fixture 100 includes a first support base $110_1$, a second support base $110_2$, a first plurality of elongate spoke supports 130, a second plurality of elongate spoke supports 140, and a plurality of radially-extendable members 150. In fixture 100, the inner hub 30, the plurality of spokes 40, and the outer band 20 are arranged to form a curing assembly. In the curing assembly, the outer band 20, the inner hub 30, and the plurality of spokes 40 are arranged in a first arrangement (see FIG. 9A for example), where the plurality of spokes are in a retracted arrangement between the outer band 20 and the inner hub 30.

Figure 4A:
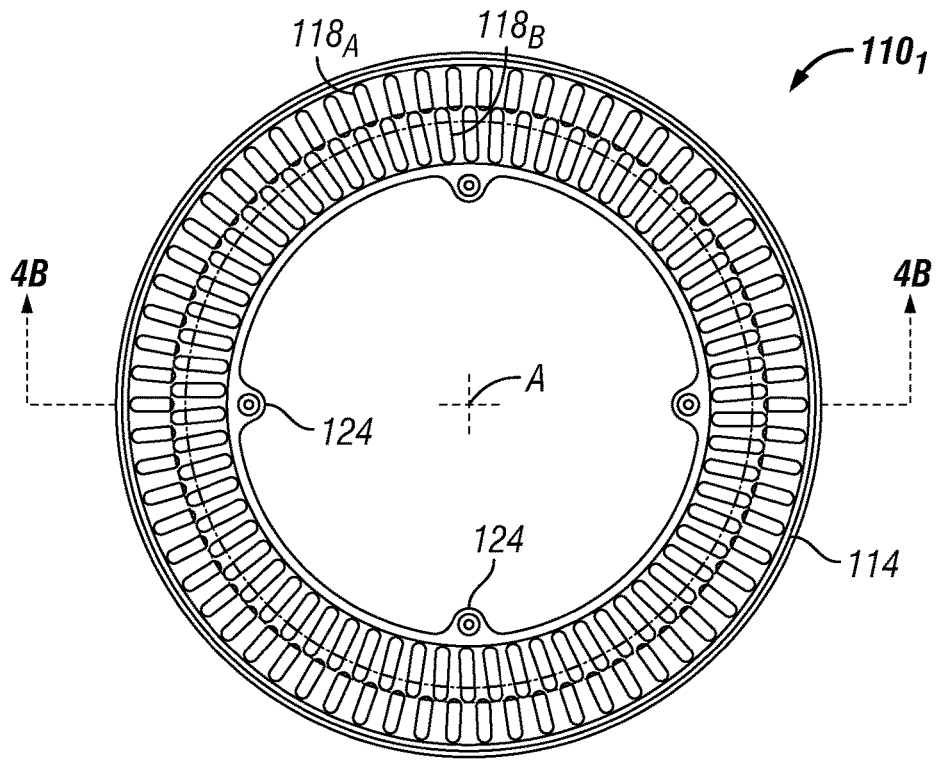
FIG. 4A is a bottom view of a first ($1^{st}$) base portion of the apparatus shown in an assembled configuration.
Figure 4B:
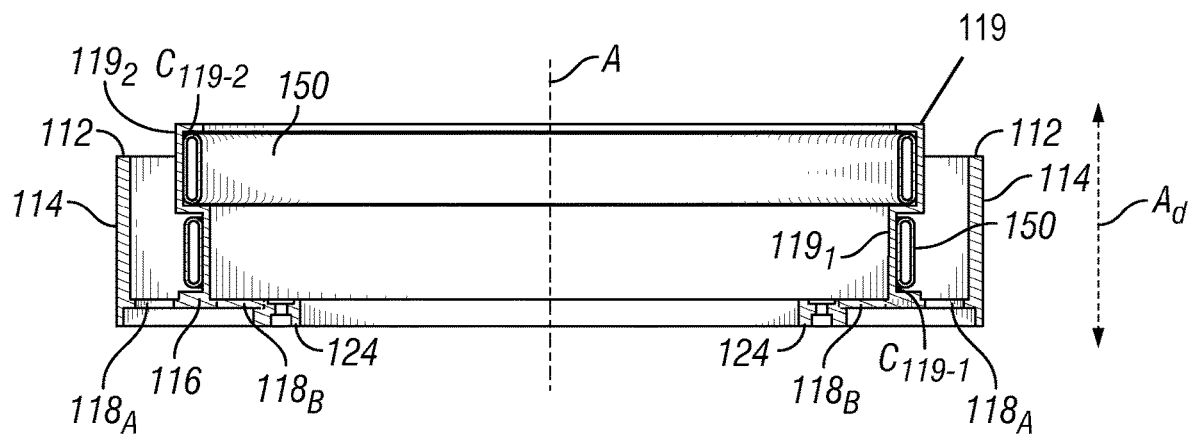
FIG. 4B is a sectional view of the first base portion taken along line 4B-4B in FIG. 4Aa.
Figure 5A:
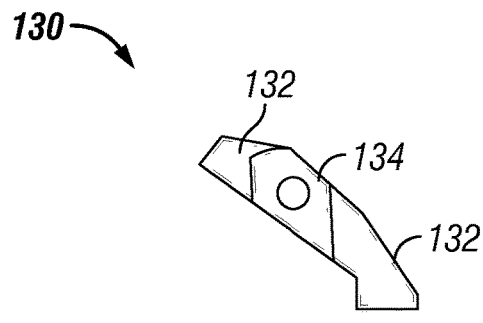
FIG. 5A is an end view of a radially outer spoke support member shown in FIG. 3.
Figure 6A:
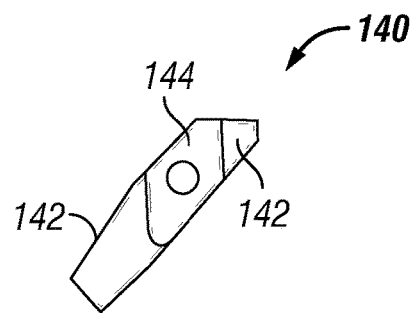
FIG. 6A is an end view of a radially inner spoke support member shown in FIG. 3.
Figure 5B:
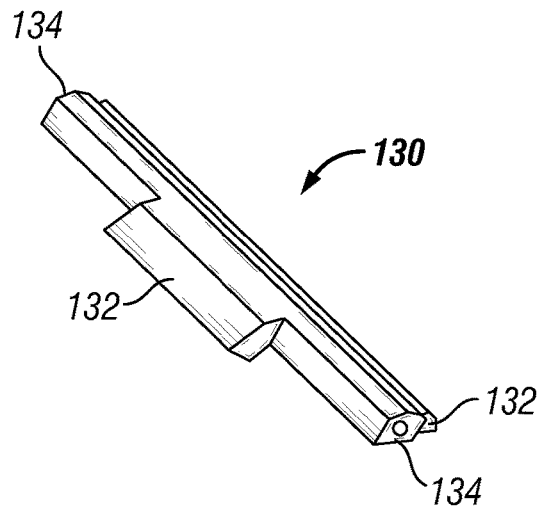
FIG. 5B is a perspective view of the radially outer spoke support member shown in FIG. 5A.
Figure 6B:
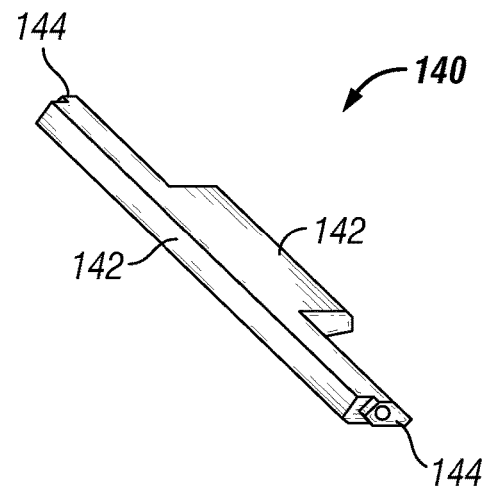
FIG. 6B is a perspective view of the radially inner spoke support member shown in FIG. 6A.

With continued reference to FIG. 3, and with additional reference to FIGS. 4A and 4B, first support base $110_1$ is shown in accordance with an exemplary embodiment. The aim of first and second support bases $110_1$, $110_2$ is to facilitate alignment of the outer band 20, the inner hub 30, and the plurality of spokes 40 in both radial and axial directions relative to one another to properly align and assemble the components of the non-pneumatic tire carcass. To assist with this endeavor, first support base $110_1$ has a first outer band abutment 112, which generally forms one or more surfaces that engage (abut) a side 26 of the outer band 20, and a first inner hub abutment 120, which generally forms one or more surfaces that engage (abut) inner hub 30. In sum, each of the first outer band abutment 112 and the first inner hub abutment 120 seek to suspend or constrain each of outer band 20 and inner hub 30 in a desired arrangement to form a unitary non-pneumatic tire carcass.

In this exemplary embodiment shown in FIGS. 3-4B, the first outer band abutment 112 forms an annular surface configured to abut a side 26 of the outer band 20 when properly arranged within fixture 100. Still, in other variations, first outer band abutment 112 may comprise one or more surfaces of any design suitable to achieve the purpose of engaging and constraining the outer band in a desired position within the fixture. For example, a plurality of surfaces, such as tabs or raised surfaces, may be spaced in an annular array may to engage a side 26 of outer band 20. In the embodiment shown, the annular surface forming first outer band abutment 112 is configured to engage substantially 360 degrees around a side 26 of the outer band 20, still, it is appreciated that in other variations a first outer band abutment 112 may engage substantially less than the 360 degrees around a side 24 of outer band 20, as the need for more or less engagement (support) may vary. For example, more or less engagement may be required depending on the stiffness of the outer band, which is based in part on its size and construction (including material). By further example, more or less engagement may be required depending on the stiffness of the first outer band abutment, which may vary based upon its size and construction (including material).

With continued reference to FIGS. 3-4B, first outer band abutment 112 is arranged at a lateral side edge of a wall 114 of first support base $110_1$. In this embodiment, wall 114 is annular, extending in an axial direction $A_d$ from a sidewall 116 and to the first outer band abutment 112. In lieu of the annular shape, sidewall 116 may form any desired structure (of any one or more components) connecting sidewall 116 and first outer band abutment 112 and of any desired shape or design suitable for supporting the first outer band abutment 112. In other variations, instead of extending in a purely axial direction $A_d$, sidewall 116 may extend partially in the axial direction, while also extending in other directions. It is also appreciated that wall may instead comprise an array of structures spaced apart around the first support base, such as is the case with the first inner hub abutment 120 in one example. In any variation, wall 116 may be permanently fixed or may be removably (that is, capable of removal without damage) arranged within first support base $110_1$.

Sidewall 116 is disc-shaped, and includes a first plurality of slots $118_A$ for receiving the first plurality of elongate spoke supports 130 and a second plurality of slots $118_B$ for receiving the second plurality of elongate spoke supports 140. Slots $118_A$ are each spaced apart and arranged in an annular array, as are slots $118_B$, where the second plurality of slots $118_B$ are arranged concentrically within (radially inward) the first plurality of slots $118_A$. The slots $118_A$, $118_B$ permit translation of each such elongate spoke support 130, 140 when forcing corresponding spokes 40 from a retracted arrangement, such as is exemplary shown in FIG. 9A, and into an extended arrangement against each of the inner hub 20 and outer band 30, such as is exemplary shown in FIG. 9B. Sidewall 116 is more generally referred to as a slot-forming structure, and in lieu of sidewall 116 being disc-shaped, any alternative structure may be employed so long as such structure provides slots $118_A$, $118_B$ to constrain and permit translation of elongate spoke supports 130, 140. For example, sidewall 116 may comprise a spaced-apart elongate members (spokes) may be provided in lieu of a disc-shaped structure.

With continued regard to FIGS. 3-4B, housing 119 provides one or more cavities $C_{119}$ for retaining one or more of the plurality of radially-extendable members 150. Housing 119 is located radially inward from first outer band abutment 112 and corresponding wall 114. In the embodiment shown, a pair of housings $119_1$, $119_2$ is provided, where the cavity $C_{119}$ of each housing $119_1$, $119_2$ controls the direction in which each corresponding radially-extendable member 150 extends. In particular, first housing $119_1$ is open on a radially outer side, and therefore is configured to permit expansion of a radially-extendable member 150 arranged therein to extend outwardly from cavity $C_{119-1}$ in a radially-outward direction. By doing so, the first plurality of elongate spoke supports 130 are directed radially outward to force corresponding spokes 40 against the outer band 20. To the contrary, second housing $119_2$ is open on a radially inner side, and therefore is configured to permit expansion of a radially-extendable member 150 arranged therein to extend inwardly from cavity $C_{119-2}$ in a radially-inward direction. By doing so, the second plurality of elongate spoke supports 130 are directed radially inward to force corresponding spokes 40 against the inner hub 30. In the exemplary embodiment shown, housings $119_1$, $119_2$ are operably connected to sidewall 116, and to one another, although in other variations, each housing $119_1$, $119_2$ may be removably connected to sidewall 116, or to any other structure.

Of the plurality of radially-extendable members 150 arranged between the first plurality of elongate spoke supports 130 and the second plurality of elongate spoke supports 140, one or more radially-extendable members 150 of the plurality of radially-extendable members 150 are arranged on opposing axial sides of the spoke-engaging portions 132, 142 of each of the first and second pluralities of elongate spoke supports 130, 140. Stated differently, one or more radially-extendable members 150 of the plurality of radially-extendable members 150 are arranged on opposing sides of the spoke-engaging portions 132, 142 (described more fully below in conjunction with FIGS. 5A-8B) along the length of the corresponding elongate spoke support 130, 140, such that with regard to each such elongate spoke support 130, 140 the one or more radially-extendable members 150 are arranged in an axial direction $A_d$ between each terminal end 134, 144 and the spoke-engaging portion 132, 142. It is noted that each radially-extendable member 150 may comprise any extendable or expandable member also capable of retraction and suitable to withstand a curing operation. For example, in the embodiment shown, each radially-extendable member 150 is a flexible bladder that is filled with pressurized gas supplied by one or more pneumatic pressure sources, such as by way of a hose or the like. Flexible bladder may be formed of an elastomer or the like, or any other flexible material, and may optionally be reinforced as desired. In other variations, for example, an annular arrangement of movable segments are extended and retracted by one or more actuators. It is appreciated that any other radially-extendable member may be employed.

Figure 7:
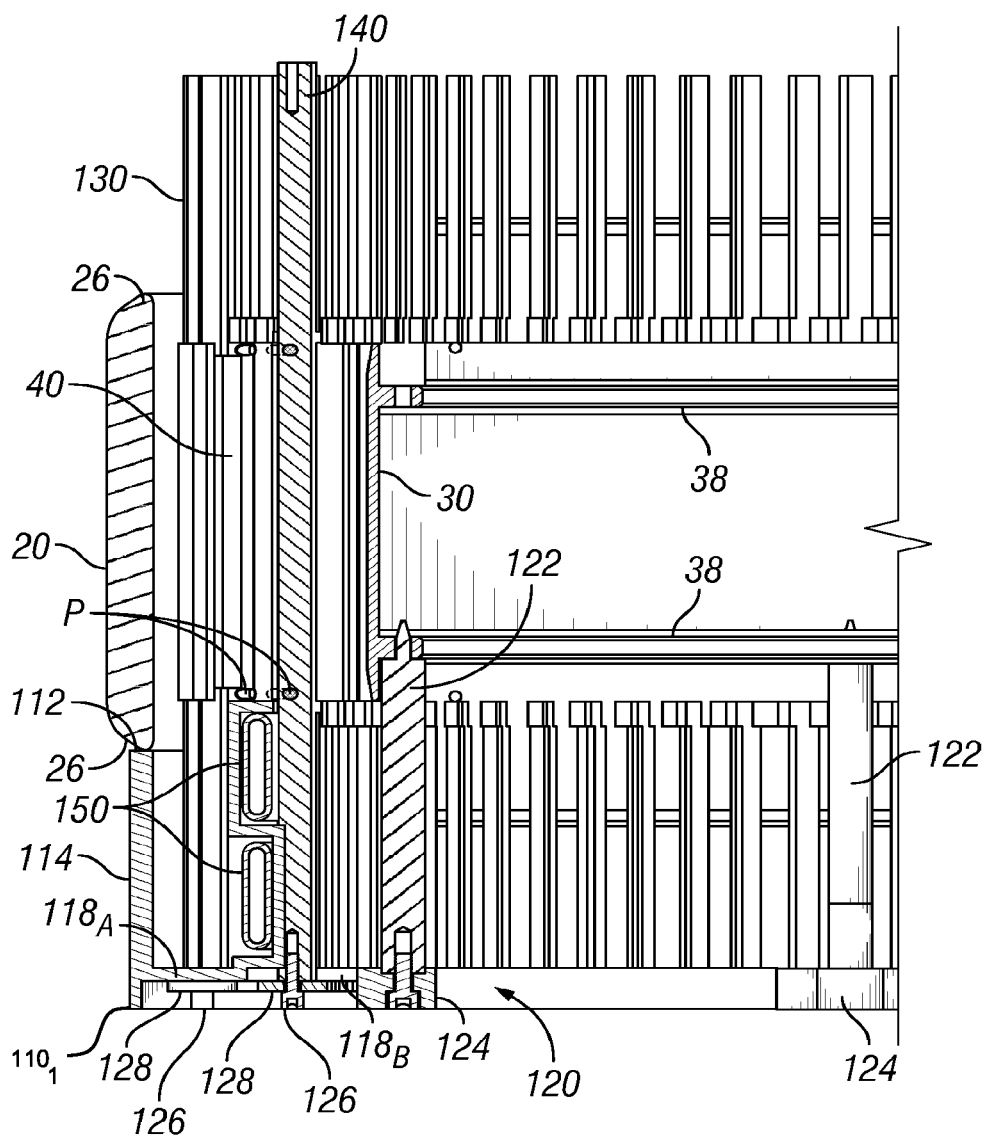
FIG. 7 is a side sectional view showing a partial assembly of the non-pneumatic tire carcass within the apparatus as shown in FIG. 3.
Figure 11A:
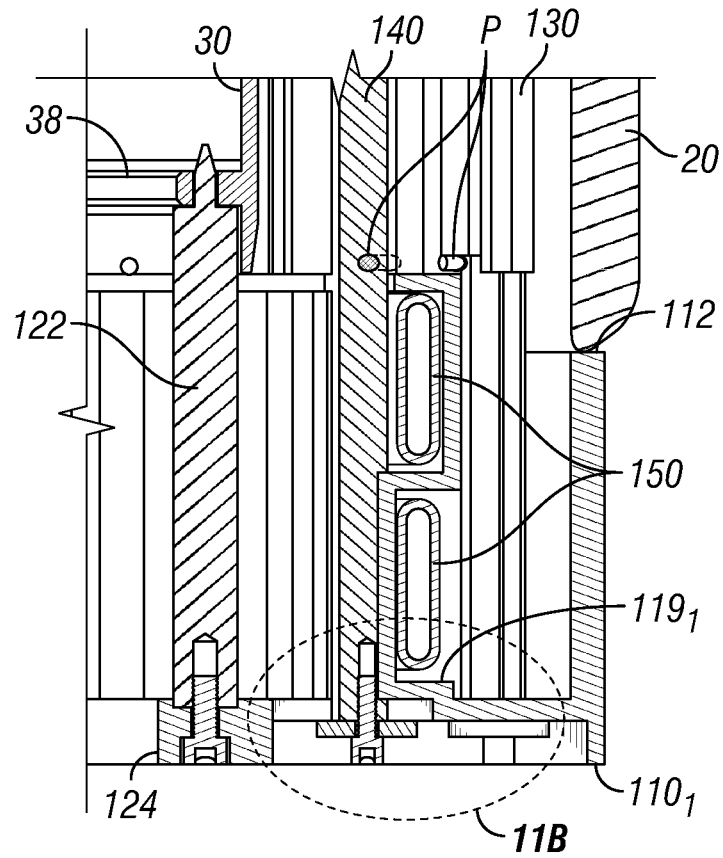
FIG. 11A is a partial sectional view showing the use of pins to constrain the radially inner and outer support members axially (that is, vertically or in the Y-direction) within the fixture.
Figure 11B:
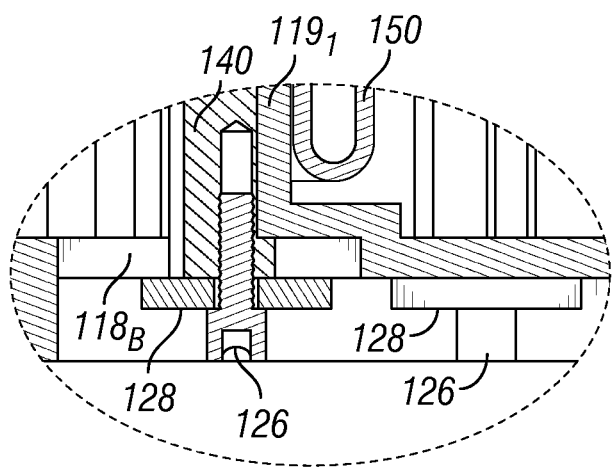
FIG. 11B is a close-up view of area 12 from FIG. 11A and the use of fasteners and slot retention tabs to secure radially inner and outer support members to a first base of the apparatus.
Figure 12:
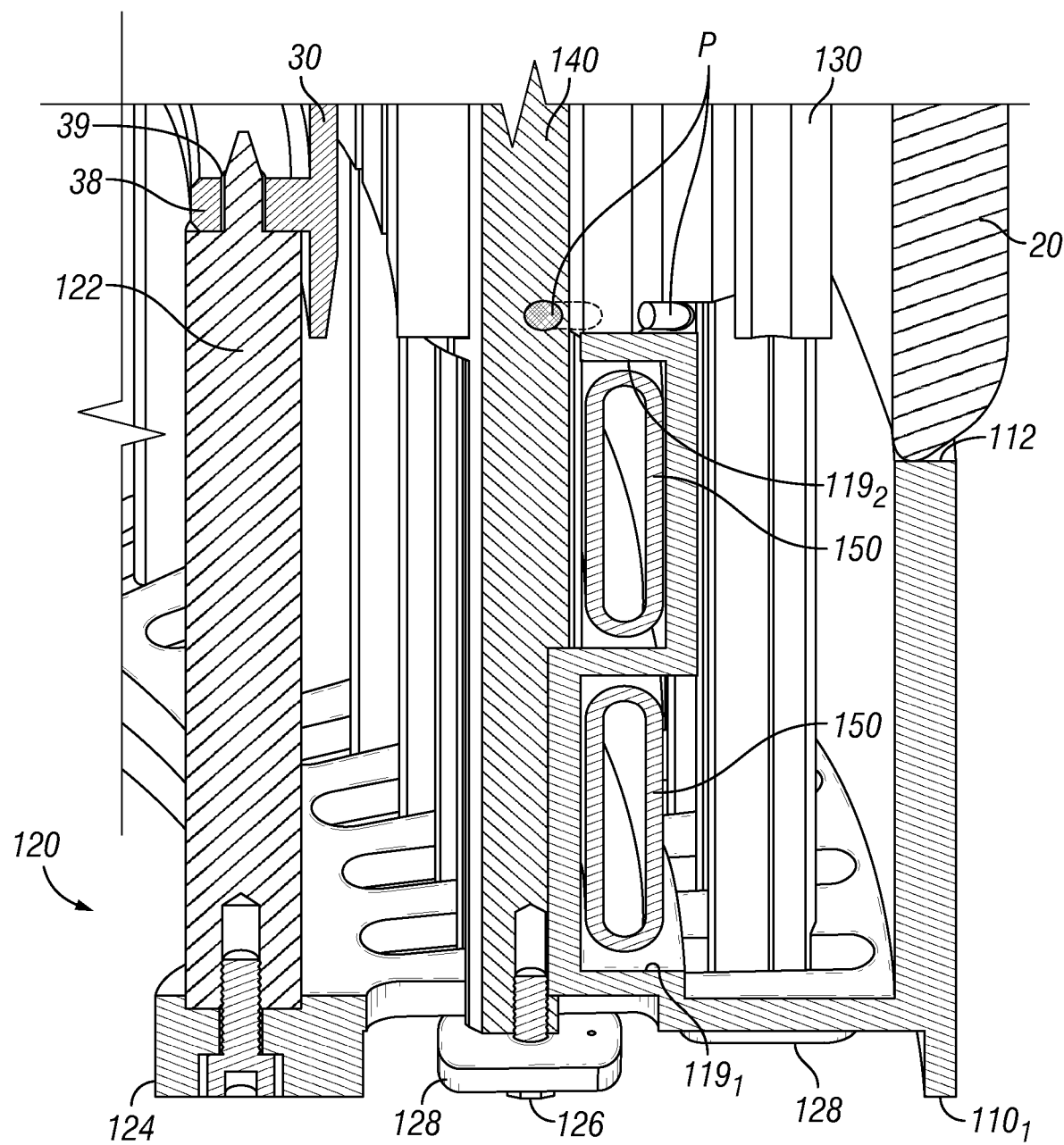
FIG. 12 is the partial sectional view of FIG. 11A shown in perspective.

With reference to FIG. 7, first support base $110_1$ includes a first inner hub abutment 120 which generally forms one or more surfaces that engage (abut) inner hub 30. In this exemplary embodiment, these one or more surfaces that engage inner hub 30 are associated with elongate members 122, which are pin-like structures, extending outwardly from sidewall 116 in an axial direction $A_d$ by a length to engage inner hub 30. More specifically, a plurality of elongate members 122 are arranged spaced apart circumferentially around the first support base to form an annular array. In the exemplary embodiment shown, each elongate member 122 extends outwardly from a separate tab 124 arranged along the sidewall 116 to extend into an aperture or recess arranged within a ring of inner hub 30. In lieu of providing a plurality of tabs 124 arranged in an annular array, an annular member may be provided, or any other structure from which all or a portion of the elongate members 122 extend, such as where multiple elongate members 122 extend from a single tab, for example. And while each elongate member 122 is connected to the sidewall 116 and each tab 124 using a fastener (see FIGS. 11A-12, for example), which permits the use of different length pins with differently configured or sized inner hubs, each pin structure may be attached in any other desired method, or may not be attached at all, but rather may simply rest within an aperture or recess without securement. Tabs 124 form structure that may extend any distance extending inwardly, that is, radially inward toward or beyond axis A to a terminal end, the figures providing an exemplary variation of this, or may extend fully across to an opposing structure of first support base $110_1$. In lieu of providing the array of elongate members 122, first inner hub abutment 120 may comprise an annular structure, such as provided for first outer band abutment 112, or any other annular or non-annular variation contemplated therefor.

It is appreciated that first support base $110_1$ and any of the components of the first support base $110_1$ described herein may be formed in any manner, and may be formed monolithically or formed of any quantity of operably connected components. With the exception of radially-extendable members 150, first support base $110_1$ may be formed of any sufficiently rigid material that remains sufficiently rigid when exposed to curing temperatures and pressures for the duration of a curing operation employed to cure the non-pneumatic tire and form an integral structure. For example, and without limitation, aluminum or steel may be employed, or any other suitable metal or non-metal material.

Figure 8B:
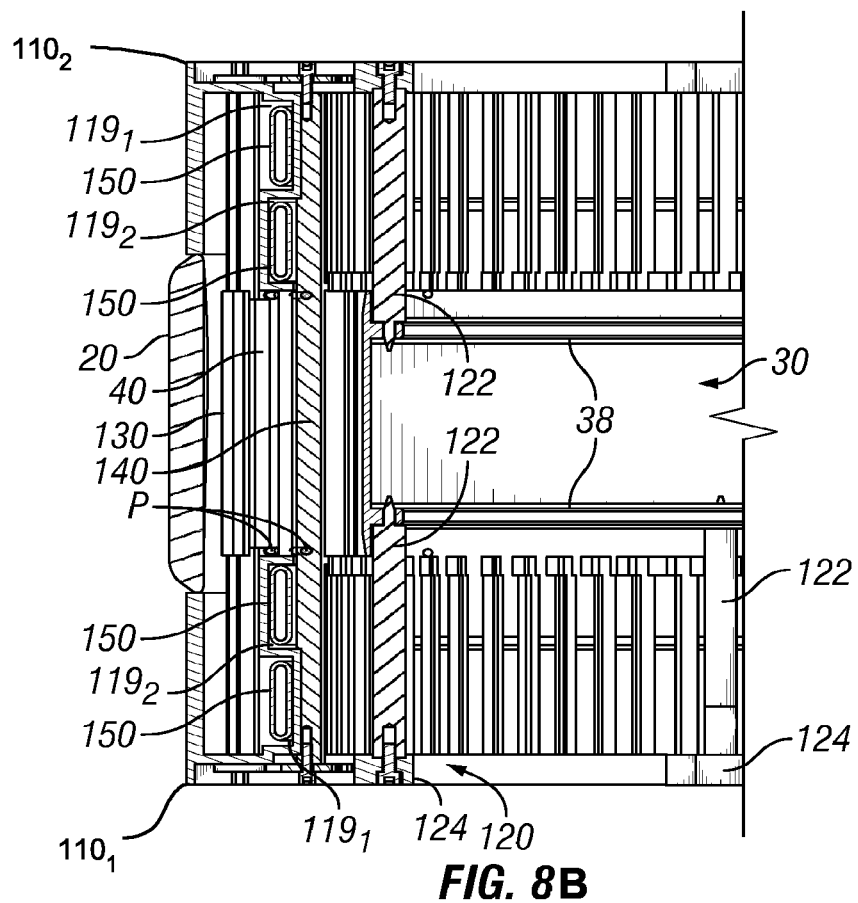
FIG. 8B is a partial side sectional view showing a full assembly of the non-pneumatic tire carcass within the apparatus as shown in FIG. 3, taken along section line 8B-8B.

With continued reference to FIG. 1, as well as FIG. 8B, second support base $110_2$ also has a second outer band abutment 112 and a second inner hub abutment 120. (See FIG. 8B.) In fixture 100, it is appreciated that second support base $110_2$ may be identical to first support base $110_1$ or it may be of a different design, such that first and second support bases $110_1$, $110_2$ may be symmetrical or asymmetrical relative to a central plane extending through the centerline of the assembled fixture. In the embodiment shown, all features and characteristics discussed is association with first support base $110_1$ are also associated with second support base $110_2$.

With reference again to FIG. 3, a first plurality of elongate spoke supports 130 and a second plurality of elongate spoke supports 140 are shown. Each plurality of elongate spoke supports 130, 140 is arranged such that, for each plurality, corresponding elongate spoke supports are spaced apart and arranged in an annular array. When arranged in fixture 100, each elongate spoke support extends in an axial direction from the first support base $110_1$ and to the second support base $110_2$, while the second plurality 140 is arranged concentrically within the first plurality 130.

With continue reference to FIG. 3, as well as FIGS. 5A-7, first plurality of elongate spoke supports 130 and second plurality of elongate spoke supports 140 are each provided to not only maintain non-pneumatic tire spokes 40 in a particular arrangement for assembly, but also to assist in forcing spokes 40 into an extended arrangement in which each spoke 40 is forced against each of the outer band 20 and inner hub 30. As noted previously, each slide within corresponding slots $118_A$, $118_B$ arranged within sidewalls $116_1$, $116_2$ of each corresponding first and second support base $110_1$, $110_2$. Elongate spoke supports 130, 140 may optionally be retained within a corresponding slot $118_A$, $118_B$ while maintaining the ability to slide within each such slot. For example, with reference to FIGS. 11 and 12, the use of fasteners 126 and slot retention tabs 128 (being larger than the slot opening and fastened to a corresponding terminal end of the corresponding elongate spoke support) may be employed to secure any inner or outer elongate spoke support member 130, 140 within each slot $118_A$, $118_B$ of first and second support base $110_1$, $110_2$. More generally, each slot retention tab 128 is any desirable structure that is wider than a corresponding slot $118_A$, $118_B$ opening so to maintain each corresponding elongate spoke support 130, 140 constrained axially relative to each corresponding slot $118_A$, $118_B$ yet radially slidable (configured to slide or translate) within each such slot $118_A$, $118_B$. In the alternative, a structure may instead be arranged within each slot $118_A$, $118_B$ that is also affixed to each terminal end 134, 144 of a corresponding elongate spoke support 130, 140 to achieve the same purposes. In lieu of providing a plurality of retention tabs 128 that form an annular array for each array of slots $118_A$, $118_B$, an annular structure may be provided to which each of the plurality of elongate spoke supports 130 are affixed, and another annular structure to which each of the plurality of elongate spoke supports 140 are affixed, or any other annular or non-annular variation contemplated therefor.

Each of elongate spoke support 130, 140 includes at least one corresponding spoke-engaging portion 132, 142 configured (shaped) to engage one or more adjacent spokes for extending the spokes 40 into extended arrangements. In the embodiment shown, each elongate spoke support 130, 140 includes two spoke-engaging portions 132, 142. In particular, one side of each elongate spoke support 130, 140 a corresponding spoke-engaging portion 132, 142 is arranged centrally along the length of each corresponding elongate spoke support 130, 140, although each may extend more or less and may be non-centrally located in other arrangements. The opposing side of each elongate spoke support 130, 140 has spoke-engaging portions 132, 142 extending substantially the full length of each elongate spoke support 130, 140, although each the spoke-engaging portions 132, 142 may extend less than the full substantial length. While the spoke-engaging portions 132, 142 on the one side are sized larger than other portions located along the length of each elongate spoke support 130, 140, it is appreciated that in other variations between corresponding terminal ends 134, 144, each elongate spoke support 130, 140 may be of any uniform or non-uniform size and/or shape.

To maintain a desired axial arrangement of the spokes 40 within fixture 100 relative to outer band 20 and inner hub 30, various features may be employed. For example, with reference to FIGS. 7, 11A, and 12, a spoke abutment P is included along each of the plurality of elongate spoke supports 130, 140. In this embodiment, spoke abutment P forms a protrusion extending outwardly from each elongate spoke support 130, 140 for the purpose of engaging one or more adjacent spokes 40 to constrain the axial location of any such spoke 40 within fixture 100, for the purpose of providing proper alignment between outer band 20 and inner hub 30 and the spokes 40. This protrusion P may be permanently affixed to the corresponding elongate spoke support 130, 140, whether formed with or later attached to the elongate spoke support, or may be removably mounted therein, such as by employing a pin P as exemplarily shown. It is appreciated that each spoke abutment P may be arranged to engage (and thereby support) any spoke 40 arranged adjacent to a corresponding elongate spoke support 130, 140, such that any spoke abutment P may engage one or both adjacent spokes 40 each of which being arranged on opposing sides of the corresponding elongate spoke support 130, 140. For example, a pin P may extend through any elongate spoke support 130, 140 to extend from both opposing sides thereof and thereby engage a pair of opposing spokes 40.

To facilitate arrangement within corresponding slots $118_A$, $118_B$ in any first or second support base $110_1$, $110_2$, corresponding terminal ends 134, 144 are sufficiently shaped for arrangement within corresponding slots $118_A$, $118_B$ to facilitate sliding of each corresponding elongate spoke support 130, 140 within the corresponding slot $118_A$, $118_B$. It is appreciated that each elongate spoke support 130, 140 may be formed of any suitable metal or non-metal, or any composite that remains sufficiently rigid during curing operations.

Figure 8A:
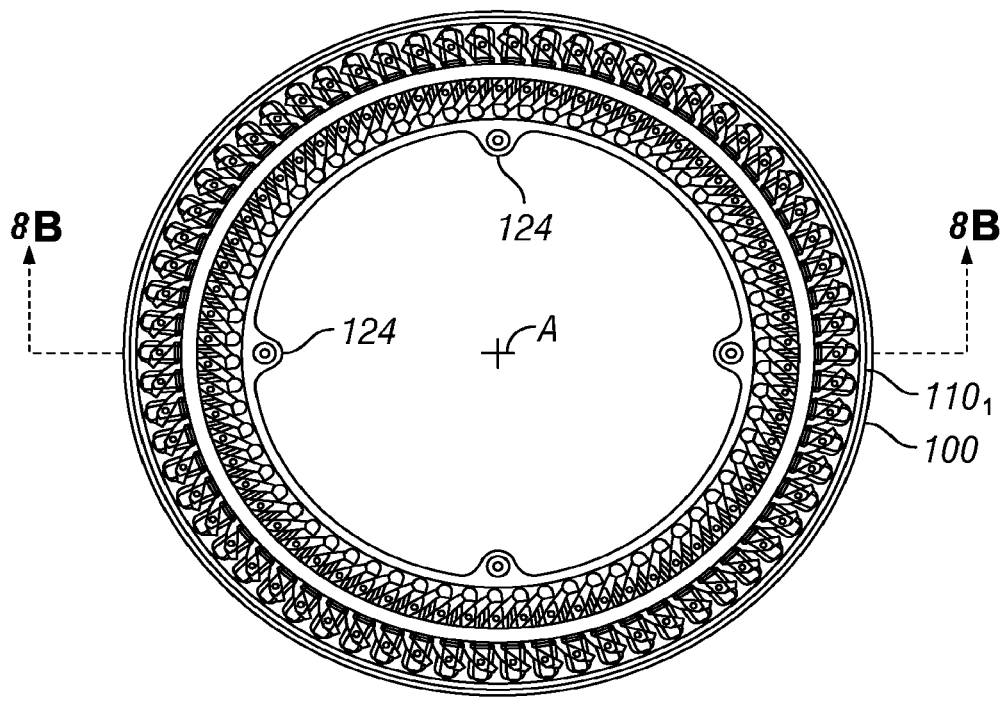
FIG. 8A is a bottom view showing a full assembly of the non-pneumatic tire carcass within the apparatus as shown in FIG. 3.

With general reference to FIG. 3, and more specifically to FIGS. 8A and 8B, outer band 20, inner hub 30, and the plurality of spokes 40 are arranged in fixture 100 to ultimately form a curing assembly, which represents an uncured version of the non-pneumatic tire carcass 10 shown in FIG. 1. In the curing assembly, the outer band 20, the inner hub 30, and the plurality of spokes 40 are arranged in a first arrangement, where the plurality of spokes are arranged in a retracted arrangement between the outer band 20 and the inner hub 30.

When using fixture 100 in this manner, for particular embodiments of the methods of forming a non-pneumatic tire carcass, as described previously, the step of arranging the inner hub 30, the plurality of spokes 40, and the outer band 20 to form a curing assembly arranged in a first arrangement within a molding fixture includes the following steps.

With general reference to FIG. 3, and more specifically to FIG. 7, such methods include arranging each of the first and second plurality of elongate spoke supports 130, 140 in the first support base $110_1$, where each elongate spoke support in each of the first and second plurality of elongate spoke supports 130, 140 is configured to translate radially from a retracted arrangement and to an extended arrangement. A first one or more radially-extendable members 150 are arranged between the first and second pluralities of elongate spoke supports 130, 140 within the first support base $110_1$.

In certain instances, each of the first and second plurality of elongate spoke supports 130, 140 are initially arranged in a retracted arrangement. Moreover, in the embodiment shown, terminal ends 134, 144 of each corresponding elongate spoke supports from the first and second plurality of elongate spoke supports 130, 140 are arranged in a corresponding slot $118_A$, $118_B$ in the first support base $110_1$ (e.g., in sidewall 116).

Thereafter, with continued reference to FIGS. 3 and 7, the plurality of spokes 40 are arranged to extend between the first and second plurality of elongate spoke supports 130, 140 and the outer band 20 and the inner hub 30 along the first support base $110_1$, where one of the opposing lateral sides 26 of the outer band 20 is arranged along the first outer band abutment 112 and where one of the opposing lateral sides of the inner hub 30 are arranged along the first inner hub abutment 120. While in particular instances, the plurality of spokes 40 are installed within the fixture 100 prior to installing the outer band 20 and inner hub 30, in other variations any different order of installing these components within the fixture may be performed.

Figure 9A:
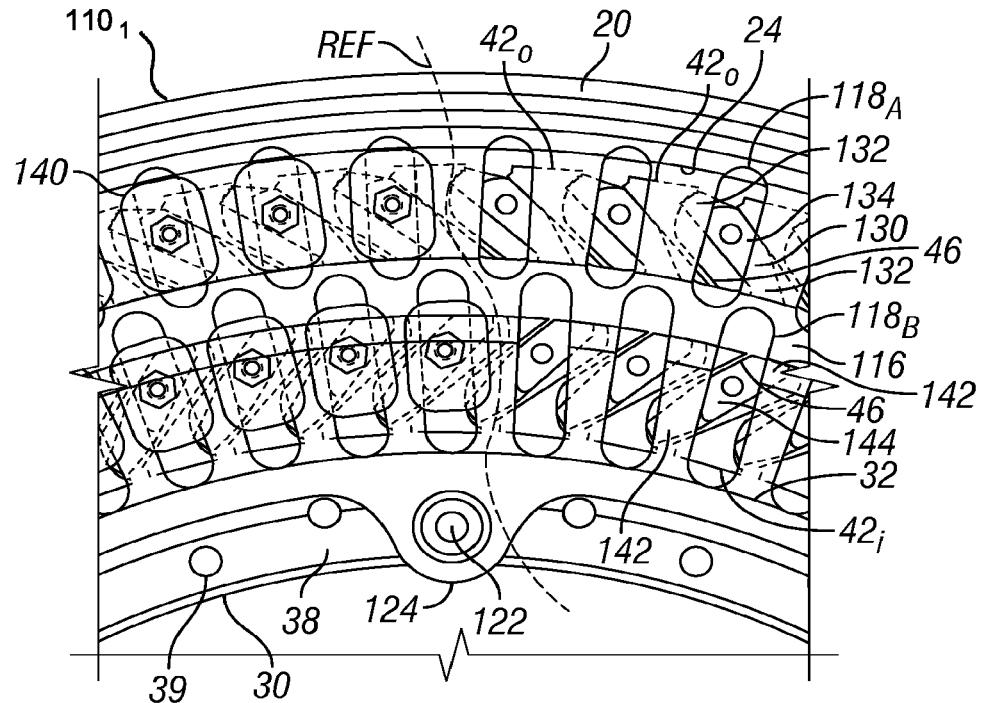
FIG. 9A is a partial bottom view of the full assembly of FIG. 8A showing a portion of the plurality of spokes arranged within the apparatus, the plurality of spokes and the radially inner and outer spoke support members being arranged in a retracted arrangement.
Figure 9B:
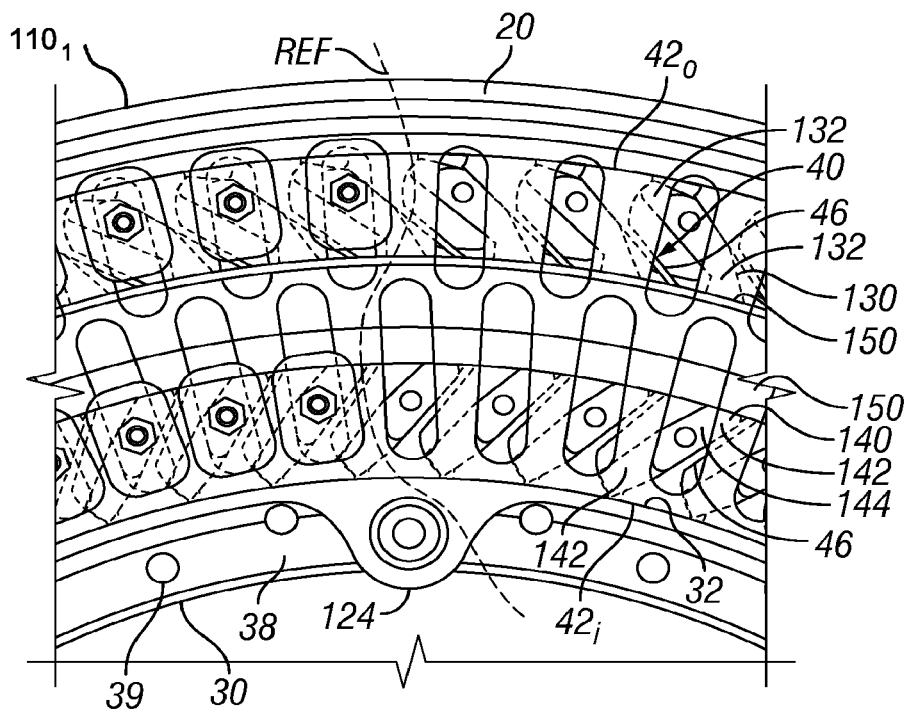
FIG. 9B is a partial side view of the full assembly of FIG. 9A showing the plurality of spokes and the radially inner and outer spoke support members now arranged in an extended arrangement.

Thereafter, with continued reference to FIG. 3 as well as FIGS. 8A and 8B, the second support base $110_2$ is arranged into engagement with the outer band 20, the inner hub 30, and the first and second pluralities of elongate spoke support members 130, 140, where the outer band 20 engages the second outer band abutment 112, the inner hub 30 engages the second inner hub abutment 120, and each elongate spoke support member of the first and second plurality of elongate spoke supports 130, 140 are arranged in the second support base $110_2$ to translate radially from a retracted arrangement and to an extended arrangement, where the second one or more radially-extendable members 150 are arranged between the first and second pluralities of elongate spoke supports 130, 140 within the second support base $110_2$. With reference now to FIGS. 9A and 9B, in forcing the plurality of spokes 40 in opposite radial directions from the first arrangement (FIG. 9A) and to a second arrangement (FIG. 9B), the plurality of radially-extendable members 150 are radially extended to force each spoke of the plurality of spokes 40 into the curing arrangement, where each spoke extends and is forced against each of the outer band 20 and the inner hub 30. It is noted that in the extended arrangement shown in FIG. 9B, each elongate spoke support engages each of a pair of adjacent spokes. It is also noted that in each of FIG. 9A and FIG. 9B, a partial cutaway line REF is shown, where the slot retention tabs 128 and corresponding fasteners shown on the right-hand side of line REF in each figure is removed from view on the left-hand side of line REF in each figure to better show the spokes 40 and elongate spoke supports 130, 140. It is appreciated that a curing bladder, as used in performing a curing operation, may be arranged around the curing assembly and the fixture before or after the curing assembly is arranged in the second arrangement or curing arrangement.

Figure 10:
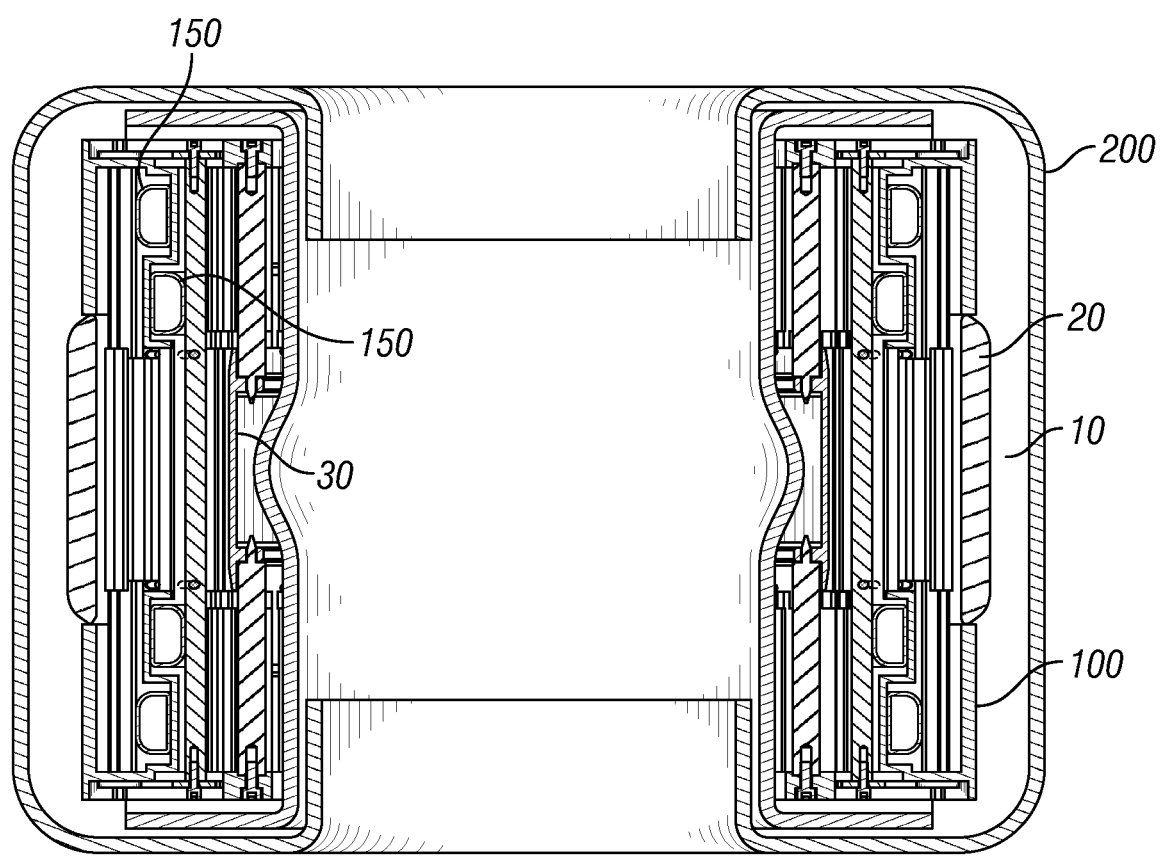
FIG. 10 is a side sectional view of the assembled apparatus (including a curing assembly of the non-pneumatic tire) of FIG. 8A (taken along section line 8B-8B), shown encased within a 2-piece curing membrane, in accordance with an exemplary embodiment.

Optionally, with continued reference to FIG. 10, the molding fixture 100 with the curing assembly (that is, the assembled non-pneumatic tire carcass) is arranged within a curing bladder 200, which encapsulates the molding fixture 100 and curing assembly and ultimately creates a seal separating its contents from the surrounding atmosphere. The curing bladder 200 may be any desired curing bladder, which is a flexible, air-impermeable membrane. The curing bladder shown is a 2-piece curing bladder, but a single piece or other multi-piece curing bladder may be employed. Once installed, a vacuum is created within the curing bladder to evacuate substantially all the gas or air within the curing bladder, which includes gas or air contained within the curing assembly. For example, the curing bladder if fluidly connected to a vacuum source, such as pump or the like, to provide the vacuum pressure. Ultimately, the curing bladder within its contents is exposed to a curing operation, where with the application of heat, the plurality of spokes are fixedly connected to each of the inner hub and outer band when the adhesive is vulcanized.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A method of forming a non-pneumatic tire carcass comprising an inner hub, an outer band, and a plurality of spokes extending between the inner hub and the outer band, the inner hub and outer band each being annular, the inner hub being arranged radially inward of the outer band, each of the inner hub and the outer band having a width extending in an axial direction and defined by opposing lateral sides, the method comprising:
   arranging the inner hub, the plurality of spokes, and the outer band to form a curing assembly arranged in a first arrangement within a forming apparatus, where the inner hub is arranged concentrically within a radially inner annular side of the outer band and the plurality of spokes are arranged between the outer band and the inner hub;
   forcing the plurality of spokes in opposite radial directions from the first arrangement and to a second arrangement, where each spoke of the plurality of spokes is forced in a curing position against the inner hub and towards the outer band in a curing arrangement; and,
   curing the plurality of spokes to each of the inner hub and outer band.

2. The method of claim 1, further comprising:
   arranging an adhesive between the each spoke of the plurality of spokes and the inner hub and between each spoke of the plurality of spokes and the outer band.

3. The method of claim 2, where in arranging the adhesive between the each spoke and the inner hub, adhesive is applied to an outer annular side of the inner hub and/or to an inner terminal end of each spoke of the plurality of spokes, and where in arranging the adhesive between each spoke and the outer band, adhesive is applied to an inner annular side of the outer band and/or to an outer terminal end of each spoke of the plurality of spokes.

4. The method of claim 1, where each spoke is elastomeric and has a length extending between inner and outer terminal ends, the length extending along a non-linear path.

5. The method of claim 1 further comprising:
arranging a curing bladder around the curing assembly and the forming apparatus; and,
creating a vacuum within the curing bladder.

6. The method of claim 5, where the curing bladder is arranged around the curing assembly after the curing assembly is arranged in the second arrangement.

7. The method of claim 1, where the forming apparatus comprises:
a first support base having a first outer band abutment and a first inner hub abutment;
a second support base having a second outer band abutment and a second inner hub abutment;
a first plurality of elongate spoke supports extending axially from the first support base and to the second support base, the first plurality arranged in a first annular array;
a second plurality of elongate spoke supports extending axially from the first support base and to the second support base, the second plurality arranged in a second annular array, the second plurality of elongate spoke supports being arranged concentrically within the first plurality of elongate spoke supports;
each elongate spoke support of the first and second plurality of elongate spoke supports having at least one spoke-engaging portion;
a plurality of radially-extendable members arranged between the first plurality of elongate spoke supports and the second plurality of elongate spoke supports, where one or more radially-extendable members of the plurality of radially-extendable members are arranged on opposing axial sides of the spoke-engaging portions of each of the first and second pluralities of elongate spoke supports;
where arranging the inner hub, the plurality of spokes, and the outer band to form a curing assembly arranged in a first arrangement within a forming apparatus includes:
arranging each of the first and second plurality of elongate spoke supports in the first support base, where each elongate spoke support in each of the first and second plurality of elongate spoke supports is configured to translate radially from a retracted arrangement and to an extended arrangement, where the first one or more radially-extendable members are arranged between the first and second annular arrays of elongate spoke supports within the first support base,
thereafter, arranging the plurality of spokes to extend between the first and second plurality of elongate spoke supports and the outer band and the inner hub along the first support base, where one of the opposing lateral sides of the outer band is arranged along the first outer band abutment and where one of the opposing lateral sides of the hub is arranged along the first inner hub abutment,
thereafter, arranging the second support base into engagement with the outer band, the inner hub, and the first and second pluralities of elongate spoke support members, where the outer band engages the second outer band abutment, the inner hub engages a second hub abutment, and each elongate spoke support member of the first and second plurality of elongate spoke supports are arranged in the second support base to translate radially from a retracted arrangement and to an extended arrangement, where the second one or more radially-extendable members are arranged between the first and second pluralities of elongate spoke supports within the second support base,
where in forcing the plurality of spokes in opposite radial directions from the first arrangement and to a second arrangement, the plurality of radially-extendable members are radially extended to force each spoke of the plurality of spokes in the curing arrangement.

8. The method of claim 7, where each of the first and second inner hub abutments comprise a plurality of elongate members, each elongate member having a length extending from the respective first or second support base and to the inner hub.

9. The method of claim 7, where each of the first and second annular arrays extend through an annular spoke-receiving area arranged between the first and second support bases.

10. The method of claim 7, where each radially-extendable members form a flexible bladder capable of extending radially with the addition of fluid.

11. The method of claim 7, where each of the first and second plurality of elongate spoke supports are arranged within a slot in the first support base and a slot in the second support base, where each elongate spoke support translates within the slot in being configured to translate radially from the retracted arrangement and to the extended arrangement.

12. An apparatus for forming a non-pneumatic tire carcass comprising an inner hub, an outer band, and a plurality of spokes extending between the inner hub and the outer band, the inner hub and outer band each being annular, the inner hub being arranged radially inward of the outer band, each of the inner hub and the outer band having a width extending in an axial direction and defined by opposing lateral sides, the apparatus comprising:
a first support base having a first outer band abutment and a first inner hub abutment;
a second support base having a second outer band abutment and a second inner hub abutment;
a first plurality of elongate spoke supports extending axially from the first support base and to the second support base, the first plurality arranged in a first annular array;
a second plurality of elongate spoke supports extending axially from the first support base and to the second support base, the second plurality arranged in a second annular array, the first plurality being arranged concentrically within the second plurality;
each of the first and second plurality of elongate spoke supports having at least one spoke-engaging portion; and,
a plurality of radially-extendable members arranged between the first plurality of elongate spoke supports and the second plurality of elongate spoke supports, where one or more radially-extendable members of the plurality of radially extendable members are arranged on opposing axial sides of the spoke-engaging portions of each of the first and second plurality of elongate spoke supports.

13. The apparatus of claim 12, where each of the first and second outer band abutments are annular.

14. The apparatus of claim 12, where each of the first and second inner hub abutments comprise a plurality of elongate members, each elongate member having a length extending from the respective first or second support base and to the inner hub.

15. The apparatus of claim 12, where each of the first and second pluralities of elongate spoke supports extend through an annular spoke-receiving area arranged between the first and second support bases.

16. The apparatus of claim 12, where each radially-extendable members form a flexible bladder capable of extending radially with the addition of fluid.

17. The apparatus of claim 12, where each of the first and second plurality of elongate spoke supports are arranged within a slot in the first support base and a slot in the second support base, where each elongate spoke support translates within the slot in being configured to translate radially from a retracted arrangement and to an extended arrangement.

18. The apparatus of claim 12, where each of the elongate spoke supports include a portion shaped to be arranged between adjacent spokes of the plurality of spokes and to engage at least one of the adjacent spokes when translating to an extended arrangement.

19. The apparatus of claim 12, where at least some of the elongate spoke supports of the plurality of elongate spoke supports include a spoke abutment, where each spoke of the plurality of spokes engages at least one spoke abutment.

20. The apparatus of claim 12, where each of first and second radially-extendable members comprise a radially outward extendable member and a radially inward extendable member, the radially outward extendable member configured to force the outer end of each corresponding spoke toward the outer band, the radially inward extendable member configured to force the inner end of each corresponding spoke toward the inner hub.

\* \* \* \* \*